United States Patent
Krietzman

[19]

[11] Patent Number: 5,997,117
[45] Date of Patent: Dec. 7, 1999

[54] RACK FRAME CABINET

[75] Inventor: William D. Krietzman, Elk, Wash.

[73] Assignee: Chatsworth Products, Inc., Westlake Village, Calif.

[21] Appl. No.: 09/090,752

[22] Filed: Jun. 4, 1998

Related U.S. Application Data

[60] Provisional application No. 60/048,906, Jun. 6, 1997.

[51] Int. Cl.$^6$ ..................................................... A47B 47/00
[52] U.S. Cl. ........................ 312/265.4; 403/171; 403/219
[58] Field of Search .............................. 312/265.1, 265.2, 312/265.3, 265.4, 257.1, 140; 403/171, 176, 217, 219, 231; 211/26, 182

[56] References Cited

U.S. PATENT DOCUMENTS

| | | |
|---|---|---|
| 3,778,932 | 12/1973 | Ewing . |
| 3,859,767 | 1/1975 | Aspenwall ........................ 403/217 X |
| 3,919,603 | 11/1975 | Salvati et al. . |
| 3,966,285 | 6/1976 | Porch et al. ........................ 312/265.4 |
| 4,045,104 | 8/1977 | Peterson ............................ 312/265.4 |
| 4,417,366 | 11/1983 | Salice . |
| 4,509,930 | 4/1985 | Schweigert et al. . |
| 4,516,376 | 5/1985 | King .................................. 403/171 X |
| 4,641,754 | 2/1987 | Hebel et al. . |
| 4,675,900 | 6/1987 | Temkin . |
| 4,768,845 | 9/1988 | Yeh . |
| 4,803,756 | 2/1989 | Hufnagel . |
| 4,814,942 | 3/1989 | Robirds et al. . |
| 5,020,866 | 6/1991 | McIlwraith ........................ 312/265.4 |
| 5,066,161 | 11/1991 | Pinney ............................... 403/217 X |
| 5,145,380 | 9/1992 | Holcomb et al. . |
| 5,165,770 | 11/1992 | Hahn . |
| 5,202,818 | 4/1993 | Betsch et al. . |
| 5,295,041 | 3/1994 | Metivier et al. . |
| 5,441,337 | 8/1995 | Mazura et al. . |
| 5,498,073 | 3/1996 | Charbonneau et al. . |
| 5,540,339 | 7/1996 | Lerman . |
| 5,542,549 | 8/1996 | Siemon et al. . |
| 5,566,836 | 10/1996 | Lerman . |
| 5,586,012 | 12/1996 | Lerman . |
| 5,713,651 | 2/1998 | Essig et al. ........................ 312/265.4 |

OTHER PUBLICATIONS

Chatsworth Products, Inc.'s Catrack Wire Management System brochure; On or Before May 1996.

Chatsworth Products, Inc.'s Brochure of Miscellaneous Computer Stand Equipment and Accessories; On or Before May 1996.

*Primary Examiner*—Janet M. Wilkens
*Attorney, Agent, or Firm*—Kennedy Covington Lobdell & Hickman

[57] ABSTRACT

An improved rack frame cabinet for supporting electronic components having a plurality of elongate frame members and a plurality of corner brackets arranged to engage at least three adjacent frame members at each corner of said cabinet. Each of the elongate frame members includes a tube portion defined by walls forming a cavity therein, a first flange member, and a second flange member. The tube portion and both of the flange members extend along the length of the elongate frame member. The first flange member is aligned with one of the walls of the tube portion of each elongate frame member. The second flange member is parallel to and offset from another wall of the tube portion of each elongate frame member. The first and second flange members are substantially perpendicular to one another. One end of each frame member is positioned at one corner of the rack frame cabinet so that a portion of the first flange member of one frame member overlaps and connects to a portion of the second flange member of one of the two adjacent frame members and a portion of the second flange member of one frame member overlaps and connects to a portion of the first flange member of the other of the two adjacent frame members.

17 Claims, 13 Drawing Sheets

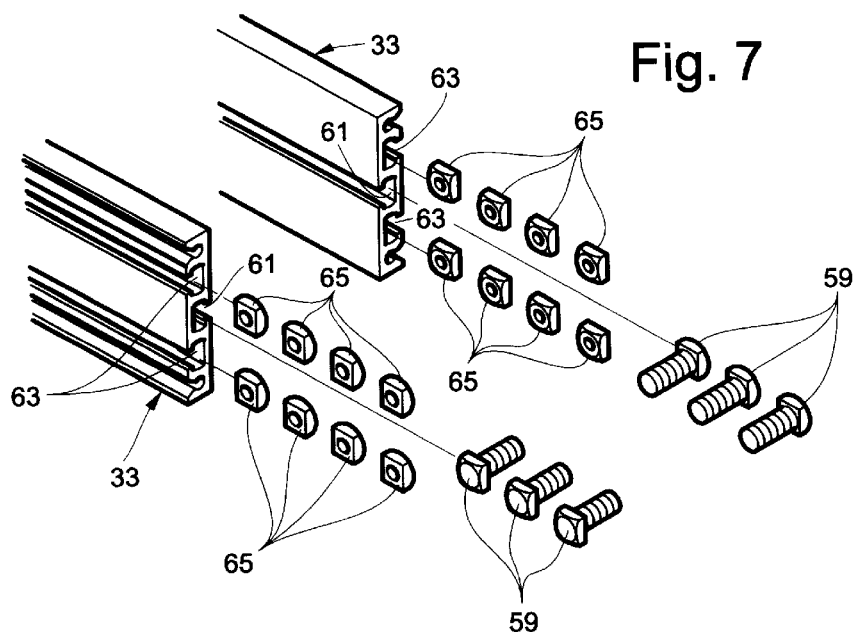
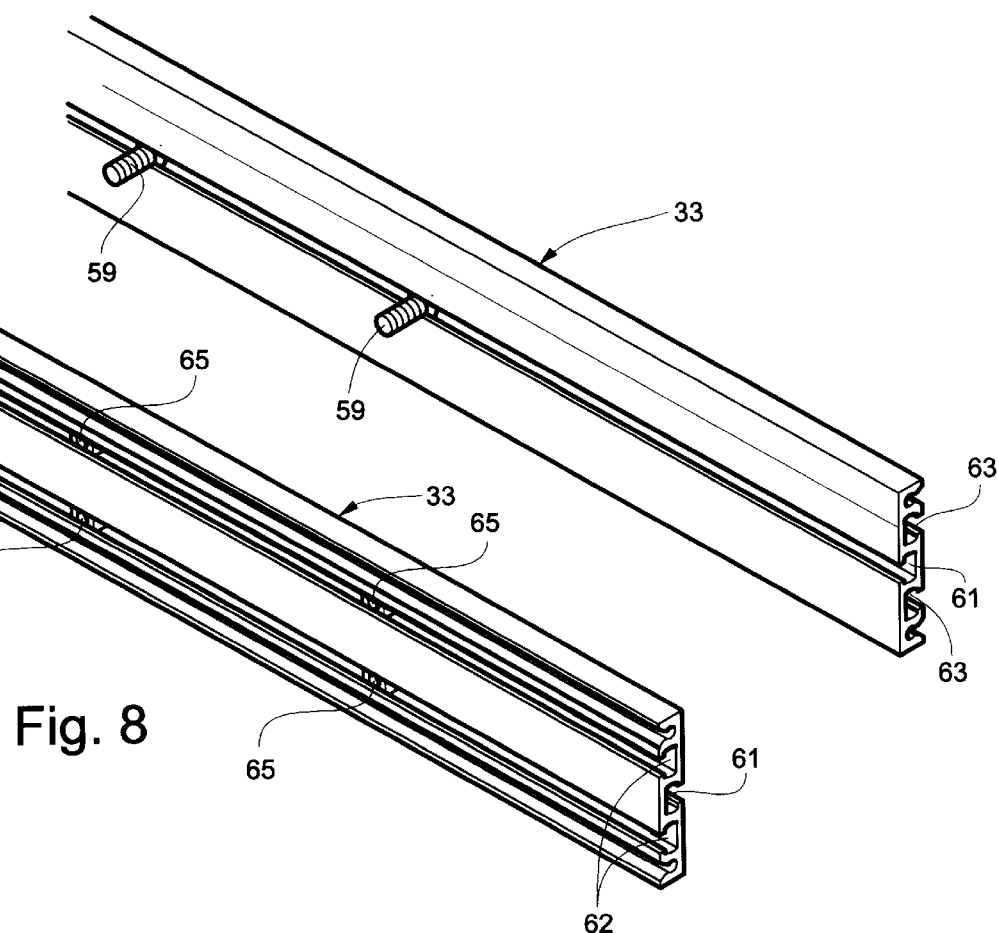

RACK FRAME CABINET

CROSS-REFERENCE TO RELATED APPLICATIONS

This disclosure incorporates and has the priority of the U.S. Provisional Patent Application Ser. No. 60/048,906, filed Jun. 6, 1997, entitled RACK FRAME CABINET.

BACKGROUND OF THE INVENTION

The present invention relates to a rack frame cabinet for supporting electronic components thereon and, more particularly, to a rack frame cabinet which can be easily and quickly assembled and configured in a number of useful arrangements.

As the importance of telecommunications and computer networks has increased, the need for efficient and easily installed racks for the mounting of such equipment has also grown. Given the significant space often required by equipment of this type, it has become increasingly desirable to mount and organize the equipment in such a way that its footprint is minimized. In addition, telecommunications and computer networks often must be expanded and updated equipment often must be added to an existing network, so that it is highly beneficial for mounting racks to allow for easy expansion, modification, and relocation.

It is well-known to provide modular racks for supporting various types of electronic components for protection of the components, provision of easy access for repair and modification of the components, organization of wiring and cabling, and improvement of the appearance of the electronic equipment. Racks of this type are frequently used with telecommunications and computer equipment and are particularly well-suited for components associated with networks of such equipment.

However, previous rack designs, such as is shown in U.S. Pat. No. 5,165,770, have often been constructed of steel components which are pre-assembled, and which therefore are costly to ship and can be difficult to move about for installation or repositioning. Other rack designs that have used frame members with different cut-outs or fastener holes depending upon the location of the frame member in the rack, as can be seen in U.S. Pat. No. 4,814,942, tend to be expensive to manufacture. Rack designs which have provided for on-site assembly often require a significant amount of time for completion of such assembly and, due to their steel construction, have been heavy and difficult to maneuver. Other rack designs, which are designed for easy and quick on-site assembly, often relied upon intricate corner or joint members to provide structural support for the cabinet, as shown in U.S. Pat. No. 4,768,845. Finally, many previous rack designs have not provided for easy expansion or addition of other rack components, such as protective enclosure walls, thereto.

BRIEF SUMMARY OF THE INVENTION

Accordingly, it is an object of the present invention to provide a rack frame cabinet which is easy and relatively inexpensive to manufacture, which can be shipped in a knocked-down or compact configuration, which can be easily and quickly assembled, which has a lightweight yet strong construction after assembly, which can easily be modified, adjusted, and expanded so as to be configured in a desired manner for a particular application, and which provides for convenient and efficient addition of rack frame components thereto.

To this end, the present invention discloses an improved rack frame cabinet for supporting electronic components having a plurality of elongate frame members and a plurality of corner brackets arranged to engage at least three adjacent frame members at each corner of said cabinet. Each of the elongate frame members includes a tube portion defined by walls forming a cavity therein, a first flange member, and a second flange member. The tube portion and both of the flange members extend along the length of the elongate frame member. Preferably, each of the elongate frame members has the same general cross-sectional profile. The first flange member is aligned with one of the walls of the tube portion of each elongate frame member. The second flange member is parallel to and offset from another wall of the tube portion of each elongate frame member. The first and second flange members are substantially perpendicular to one another.

Further, each frame member is positioned at a particular corner of the rack frame cabinet so that a portion of the first flange member of one frame member overlaps and connects to a portion of the second flange member of each of the two adjacent frame members and a portion of the second flange member of one frame member overlaps and connects to a portion of the first flange member of each of the adjacent frame members.

It is preferred that each corner bracket include at least three lugs oriented at right angles to each other. These lugs are shaped to engage in friction fit with the cavity formed in each of the three adjacent frame members to which the corner bracket connects. At least two of the three lugs of each corner bracket are positioned in the same plane. Further, at least one of the three lugs extends perpendicularly to the other two lugs. In the preferred embodiment of the present invention, the one perpendicularly-extending lug has a generally cross-shaped profile and the two lugs, which are in the same plane, have a generally H-shaped profile.

It is also preferred that the second flange member of each frame member be offset from the other wall of the tube portion by a distance approximately equal to the thickness of the first flange member. In this manner, when a portion of the first flange member of one frame member overlaps a portion of the second flange member of each of the two adjacent frame members, the first flange member aligns with the one wall of the tube portion of each of the adjacent two frame members. Likewise, when a portion of the second flange member of one frame member overlaps a portion of the first flange member of each of the two adjacent frame members, the first flange member of each of the adjacent frame members aligns with the one wall of the tube portion of the one frame member. It is also preferred that the first flange member have a width greater than the second flange member.

Finally, it is preferred that each flange member have fastening holes drilled therein. Such holes are useful for receiving threaded fasteners, such as nuts and bolts, which enable a portion of the first flange member of one frame member to connect with a portion of the second flange member of each of the two adjacent frame members when the first and second flange members are arranged in overlapping relation at each corner of the cabinet.

BRIEF DESCRIPTION OF THE DRAWINGS

FIG. 4b is an exploded isometric view of the corner of FIG. 4a;

FIG. 7 is an isometric view of two of the guide rails of the rack frame cabinet of FIG. 1 with sliding fasteners and nuts shown uninstalled;

FIG. 8 is a view of the guide rails of FIG. 7 with sliding fasteners and nuts installed therein;

DESCRIPTION OF THE PREFERRED EMBODIMENT

Figure 1:
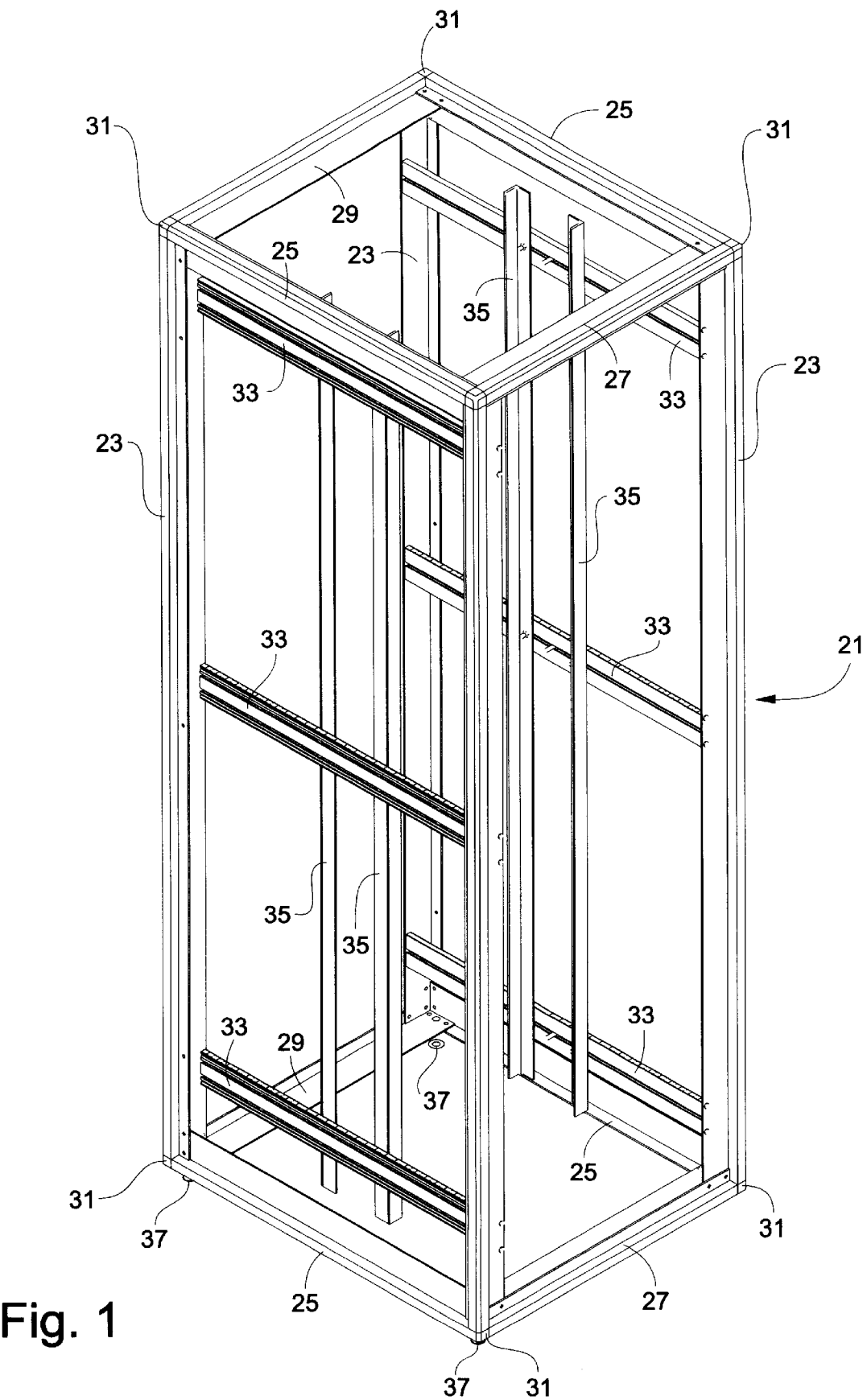
FIG. 1 is an assembled isometric view of the rack frame cabinet of the present invention.

Referring now to the accompanying drawings, FIG. 1 illustrates a rack frame cabinet 21 of the present invention comprising a parallelepiped structure with a plurality of elongate frame members and corner brackets. The elongate frame members include four vertically extending posts 23, four side cross members 25, two front cross members 27, and two rear cross members 29. The posts 23 and cross members 25,27,29 are joined together at the respective corners of the rack frame cabinet 21 by corner brackets 31 and threaded fasteners in a manner to be described in more detail below.

Three guide rails 33 are mounted on each side of the rack frame cabinet 21 on posts 23, and provide an adjustable mounting for rack rails 35, which extend vertically and have a series of holes formed therein, preferably in a universal alternating hole pattern, such as ⅝"—⅝"—½"—to allow quick and easy mounting therein of a wide variety of equipment configured for such mounting hole patterns. The rack rails 35 are mounted on the guide rails 33 by means of a sliding screw arrangement which will be discussed in greater detail presently, and which allows the rack rails 35 to be adjustably positioned at the desired location along the horizontal extent of the guide rails 33. The rack frame cabinet 21 is supported on conventional leveler feet 37, which may be adjusted to bring the rack frame cabinet 21 into the level position, as is well-known in the art.

Figure 2:
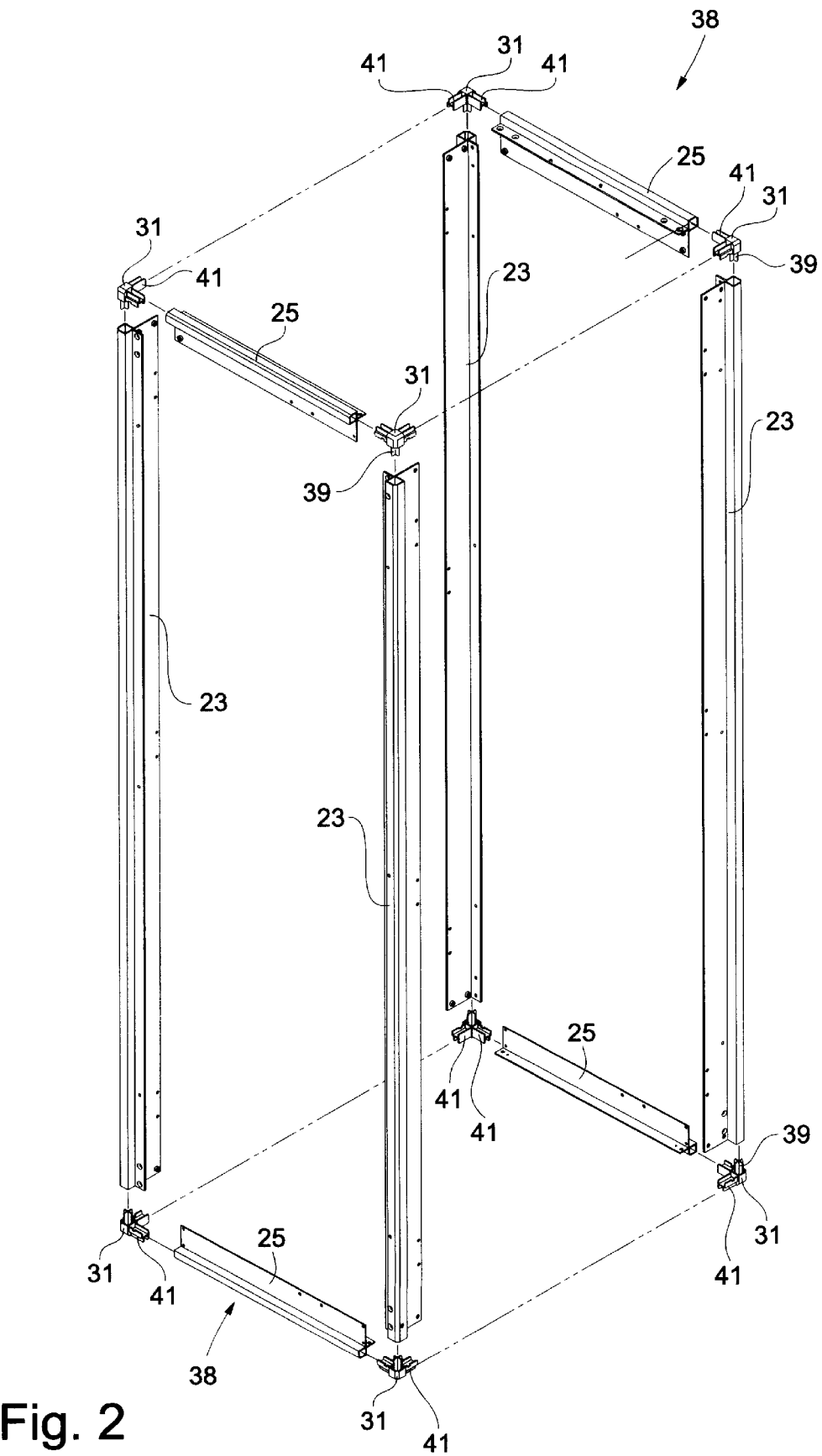
FIG. 2 is an exploded isometric view of a portion of the rack frame cabinet of FIG. 1.

In FIG. 2, two side subframes 38 of the rack frame cabinet 21 of the present invention are shown partially exploded, with the corner brackets 31 aligned with the respective posts 23 and side cross members 25 into which they will be engaged when assembled. Each of the corner brackets 31 has a projecting vertical lug 39 which will be engaged in a corresponding cavity (see FIG. 3) of the respective posts 23. The corner brackets 31 also each have a pair of projecting horizontal lugs 41, one of which is for insertion into a corresponding cavity of a respective side cross member 25, and the other of which is for insertion into a corresponding cavity of a respective front cross-member 27 or rear cross member 29. Vertical lugs 39 and horizontal lugs 41 are configured to provide a friction fit in the respective posts 23 and cross members 25,27,29, so as to align the respective components in the proper right angle relationship and to hold such components in place while assembly is completed. The posts 23 and side cross members 25 are secured to each other by means of threaded fasteners (see FIG. 4c) engaged through appropriate holes 43 in the posts 23 and side cross members 25.

Figure 3:
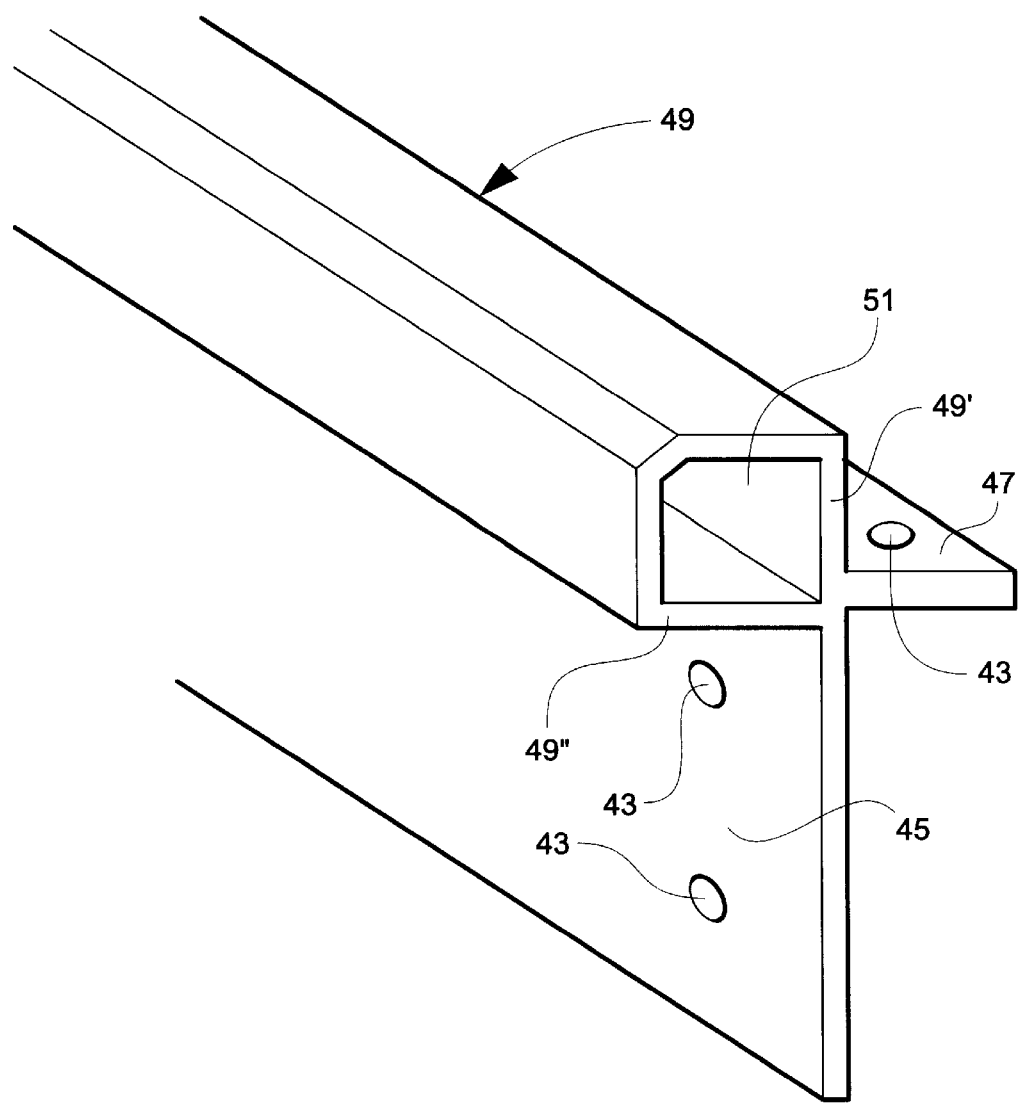
FIG. 3 is a cross-sectional view of one of the frame members of the rack frame cabinet of FIG. 1.

The main structural components of the rack frame cabinet 21, the posts 23 and cross members 25,27,29, are in the preferred embodiment formed from an aluminum extrusion having a shape as shown in FIG. 3. The extrusion includes a large flange 45, a small flange 47, and a tube portion 49, which defines a cavity 51. The large flange 45 is aligned with a wall 49' of the tube portion 49, but the small flange 47 is slightly offset from a wall 49" of the tube portion 49 to assist in interconnection of the structural components as will be described presently. Appropriate holes 43 are formed in the flanges 45,47 to provide for easy connection of, for example, one of the posts 23 with one of the side cross members 25 by lapping portions of their respective flanges 45,47, aligning the holes 43 formed in such flanges, and interconnecting the flanges by means of a threaded fastener (see FIG. 4c) engaged in the holes 43. Other lightweight metals or substances may be used to form posts 23 and cross members 25,27,29, and heavier materials such as steel can be used in appropriate applications.

In the preferred embodiment, interconnection of the extruded posts 23 and cross members 25,27,29 is accomplished by affixing the large flange 45 of one structural component to the small flange 47 of another structural component at right angles to each other, which in the parallelepiped form of the rack frame cabinet 21 of the present invention allows for formation of strong and rigid joints while allowing the use of the same simple extruded form, as shown in FIG. 3, for all of the posts 23 and cross members 25,27,29.

Figure 4A:
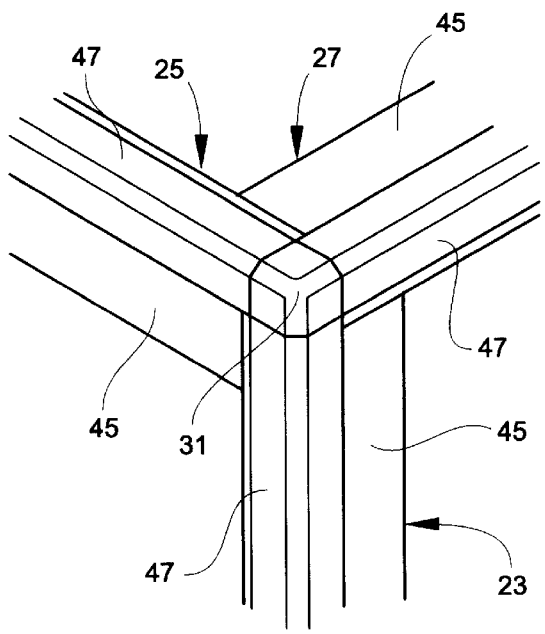
FIG. 4a is an assembled isometric view of a corner of the rack frame cabinet of FIG. 1.
Figure 4B:
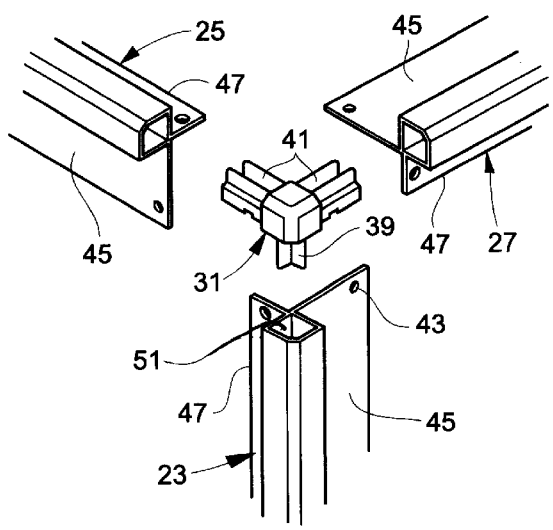
Figure 4C:
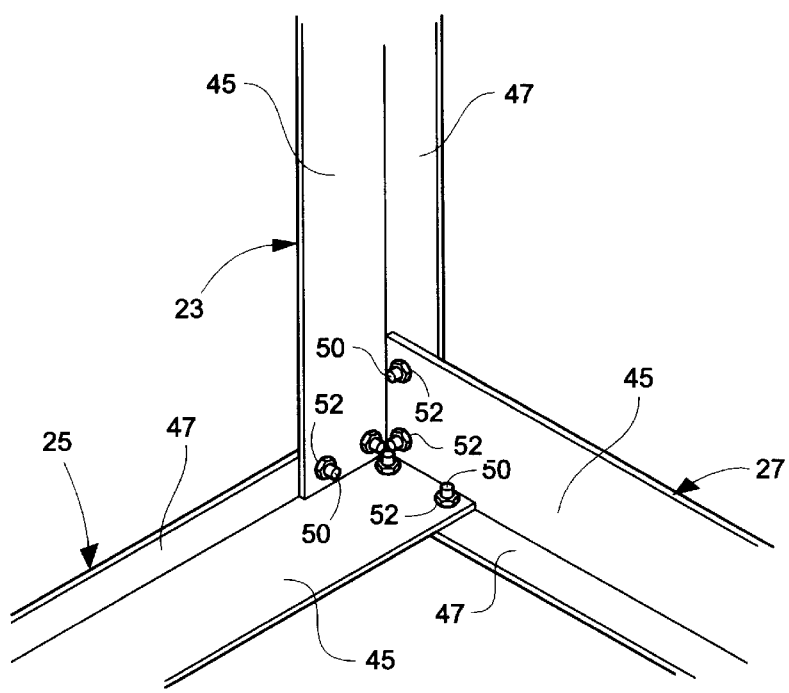
FIG. 4c is an isometric view of the corner of FIG. 4a from a different perspective.

FIGS. 4a, 4b, and 4c illustrate the interconnection of the post 23, the side cross member 25, and the front cross member 27 with the corner bracket 31. The large flange 45 of each structural component is fastened to the small flange 47 of the corresponding structural component by threaded fasteners 50, which are engaged in self-clinching fasteners 52, such as the PEM nuts made by the Penn Engineering & Manufacturing Corp. of Danboro, Pa., or the like. The slight offset of the small flanges 47 from the respective tube walls 49" allows the tube portions 49 to be oriented in a beneficial arrangement that aligns each of the cavities 51 to receive the lugs 39,41 of the corner brackets 31, as shown in FIGS. 4a and 4b, and at the same time allows the structural components 23,25,27 to nest together with their respective flanges 45,47 lapping each other for interconnection, as shown in FIG. 4c. Thus, the structural components 23,25,27 can be assembled by first fitting the components in the corner bracket 31, which holds them in proper alignment and orientation, and then engaging the threaded fasteners 50 in the nuts 52.

Figure 5:
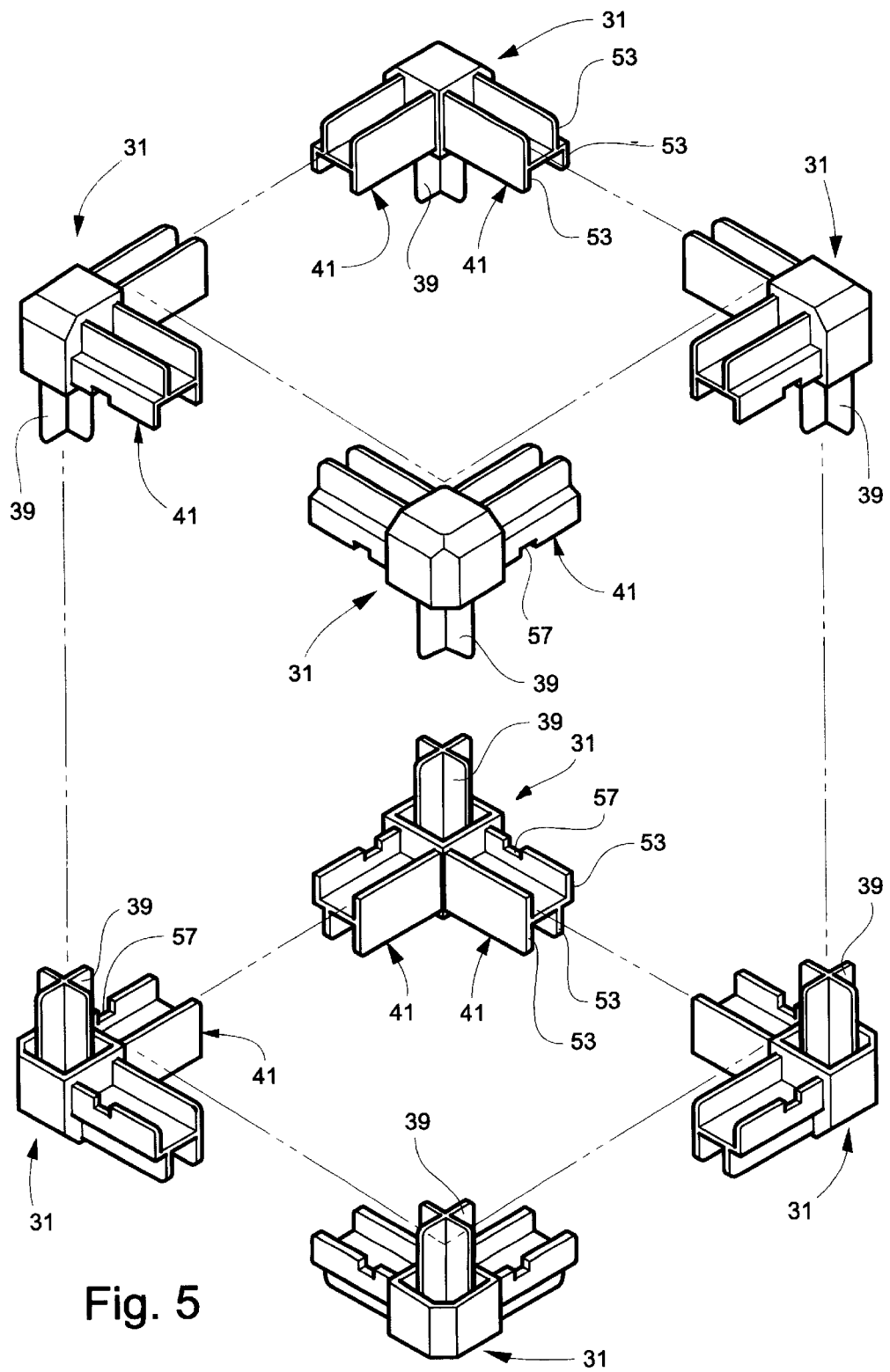
FIG. 5 is an isometric view of the corner brackets of the rack frame cabinet of FIG. 1.

FIG. 5 shows the corner brackets 31, each of which include the aforementioned vertical lug 39 and two horizontal lugs 41. The vertical lugs 39 have a cross-shaped profile which provides for a friction fit in the cavity 51 of each of the posts 23. The horizontal lugs 41 have a modified H-shaped profile which likewise provides for a friction fit in the cavity 51 of cross members 25,27,29, and the legs 53 of the horizontal lugs 41 provide for positional stability of the respective cross member 25,27,29 which is mounted on the horizontal lug 41. The modified H-shape of the profile of the horizontal lug 41, however, allows for some dimensional variation in the cavity 51 of the cross member 25,27,29, since the profile of the horizontal lug 41 does not entirely fill the cavity 51. It will be understood that other suitable shapes for the profile of the horizontal lug 41 and vertical lugs 39 can be used without departing from the scope of the present invention. A notch 57 is also formed in the horizontal lug 41 to allow clearance for insertion of a door pivot pin (see FIG. 11) into cross members 27,29 for a purpose that will be described in detail presently.

Figure 6:
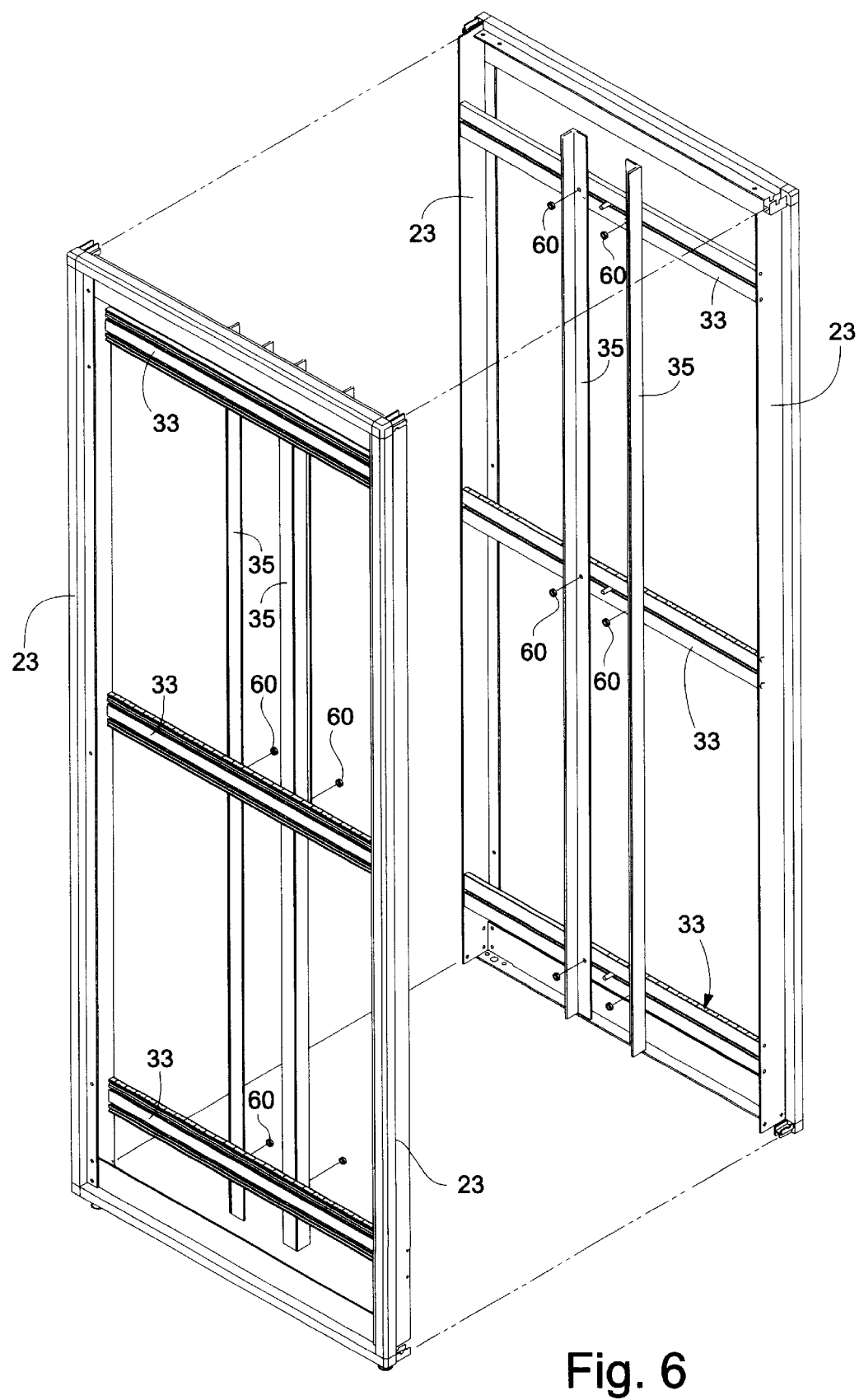
FIG. 6 is an isometric view of a portion of the rack frame cabinet of FIG. 1 showing attachment of the mounting rails to the guide rails.

As shown in FIG. 6, the guide rails 33 are mounted on the large flanges 45 of the posts 23 by means of threaded fasteners engaged through appropriate holes (not shown). The posts 23 are oriented so that the large flanges 45 project toward the interior of the rack frame cabinet 21, and the mounting of the guide rails 33 thereon positions the guide rails 33 inset toward the interior of cabinet 21.

Referring to FIGS. 6, 7, and 8, the rack rails 35 are mounted on threaded fasteners 59 which are received in the guide rail 33 along an inward T-slot 61 oriented to the interior of the rack frame cabinet 21, and the rack rails 35 are secured thereon by nuts 60. In the preferred embodiment, three threaded fasteners 59 are received in the inward T-slot 61 of each guide rail 33 to provide for flexibility in mounting rack rails 35 thereon, although other quantities of the threaded fasteners 59 could also be received in the T-slot 61 as desired. In addition, in the preferred embodiment, each guide rail 33 has two outward T-slots 63 formed therein, and four square nuts 65 are slidingly received in each of the outward T-slots 63, and it will be understood that more or less of the square nuts 65 could be installed in the outward T-slots 63. By this arrangement, it is possible to mount cable management components, such as vertical cable rings (see FIG. 15), power strips (not shown), and other useful items on the guide rails 33 to assist in efficient organization of wiring and cabling associated with the components mounted the rack frame cabinet 21.

It will be understood that the rack rails 35 which are mounted on the guide rails 33, as shown in FIG. 6, can be positioned at an infinite variety of locations along the horizontal extent of the guide rails 33 through sliding movement of the threaded fasteners 59 received in the inward T-slots 61 of the guide rails 33. Thus, where two rack rails 35 are mounted in the guide rails 33 on one side of the rack frame cabinet 21, the pair of rack rails 35 can be positioned separated by a variety of selective distances, or can be positioned adjacent one another so as to essentially form one U-shaped channel member, which may be desirable for mounting large components in the rack frame cabinet 21. It should be noted that the position of the rack rails 35 can be fixed by appropriate tightening of the nuts 60 which are engaged on the threaded fasteners 59 mounting the guide rails 35.

Figure 9:
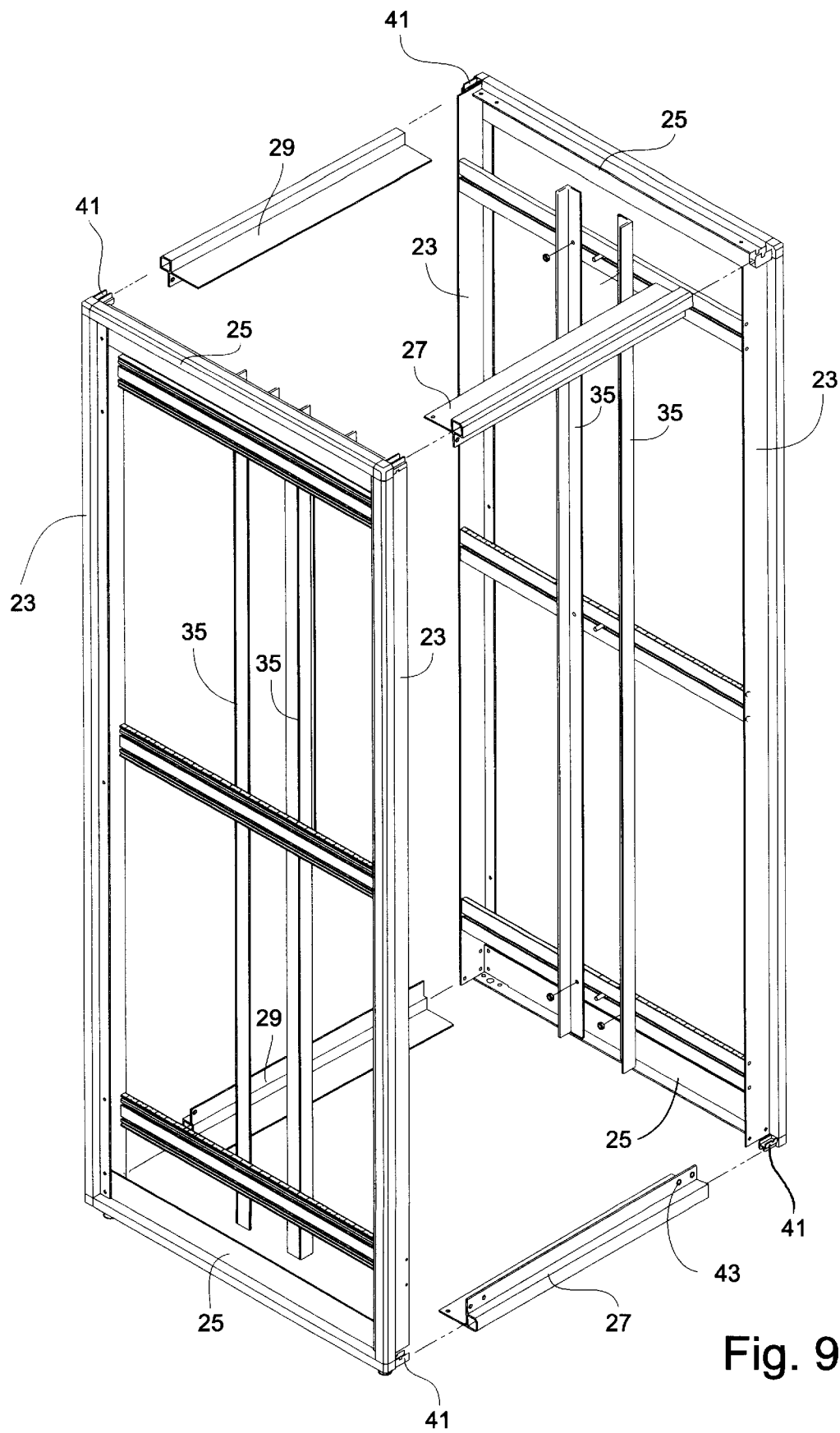
FIG. 9 is a partially exploded isometric view of the rack frame cabinet of FIG. 1.

In FIG. 9, the front cross members 27 and rear cross members 29 are shown in position to engage the respective horizontal lugs 41 of the corner brackets 31 so as to join the two sides of the rack frame cabinet 21 to form an assembled structure. The cross members 27,29 are joined to the posts 23 by use of threaded fasteners engaged in the appropriate holes 43 as described above.

Figure 10:
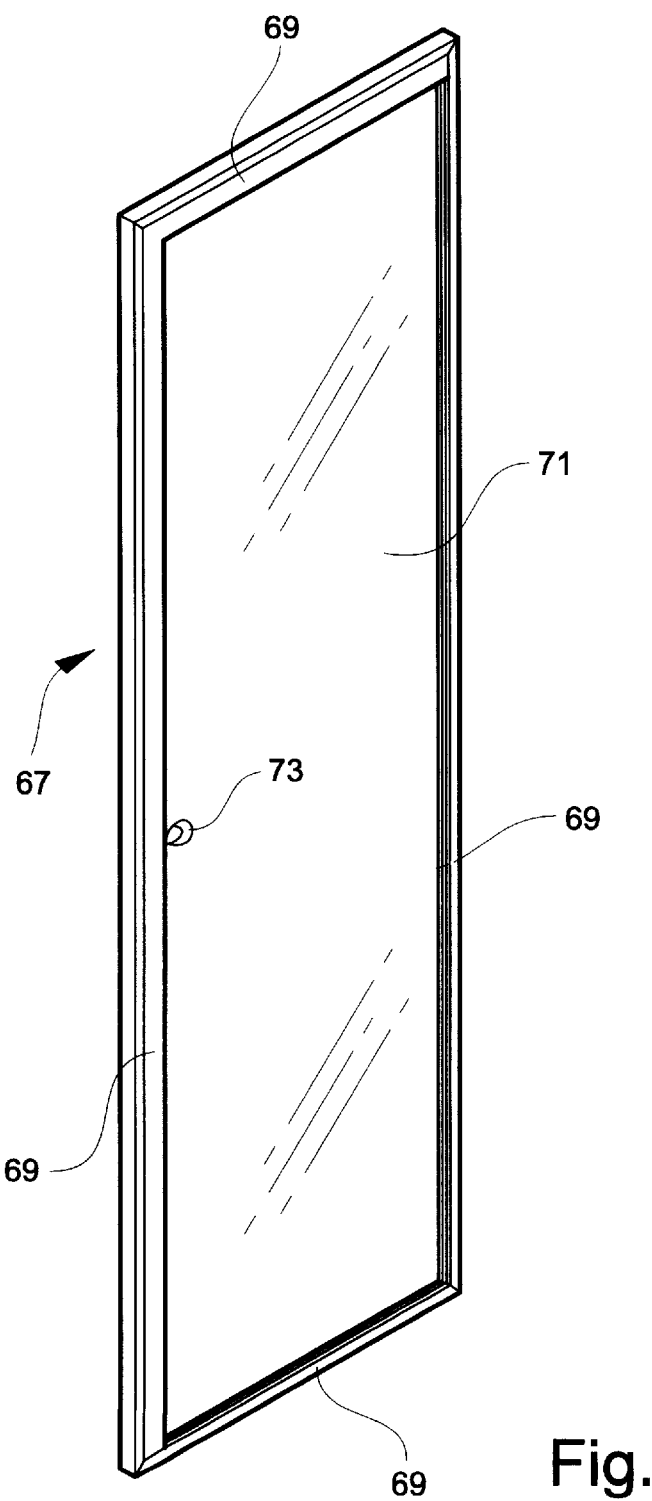
FIG. 10 is an isometric view of a door for installation in the rack frame cabinet of FIG. 1.

The rack frame cabinet 21 of the present invention may also be outfitted with front doors such as the plexiglass door 67 shown in FIG. 10. Door 67 includes metal frame members 69 and plexiglass panel 71. In addition, a lock set 73 may be provided for enhanced security.

Figure 11:
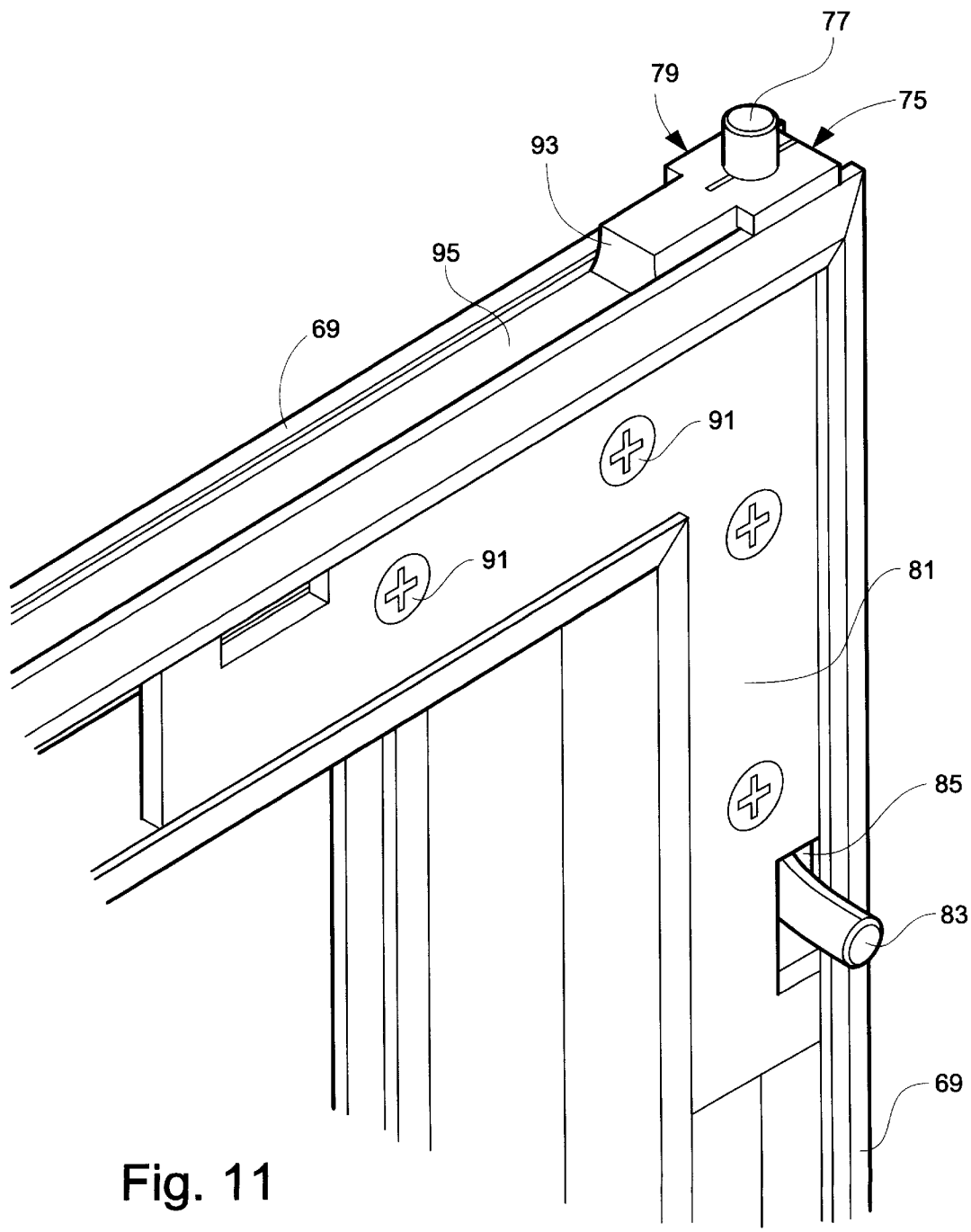
FIG. 11 is an isometric view of a retractable pivot pin assembly of the door of FIG. 10.

The door 67 is mounted in the rack frame cabinet 21 by a retractable door pivot pin assembly 75 which is shown in FIG. 11 and includes pivot pin 77, split bushing 79, and angle bracket 81. When the door 67 is installed in the rack frame cabinet 21, the pivot pin 77 extends into an appropriate bore (not shown) formed in the front cross members 27 or rear cross members 29, and is engaged in notch 57 of the corner brackets 31 (see FIG. 5).

Figure 12:
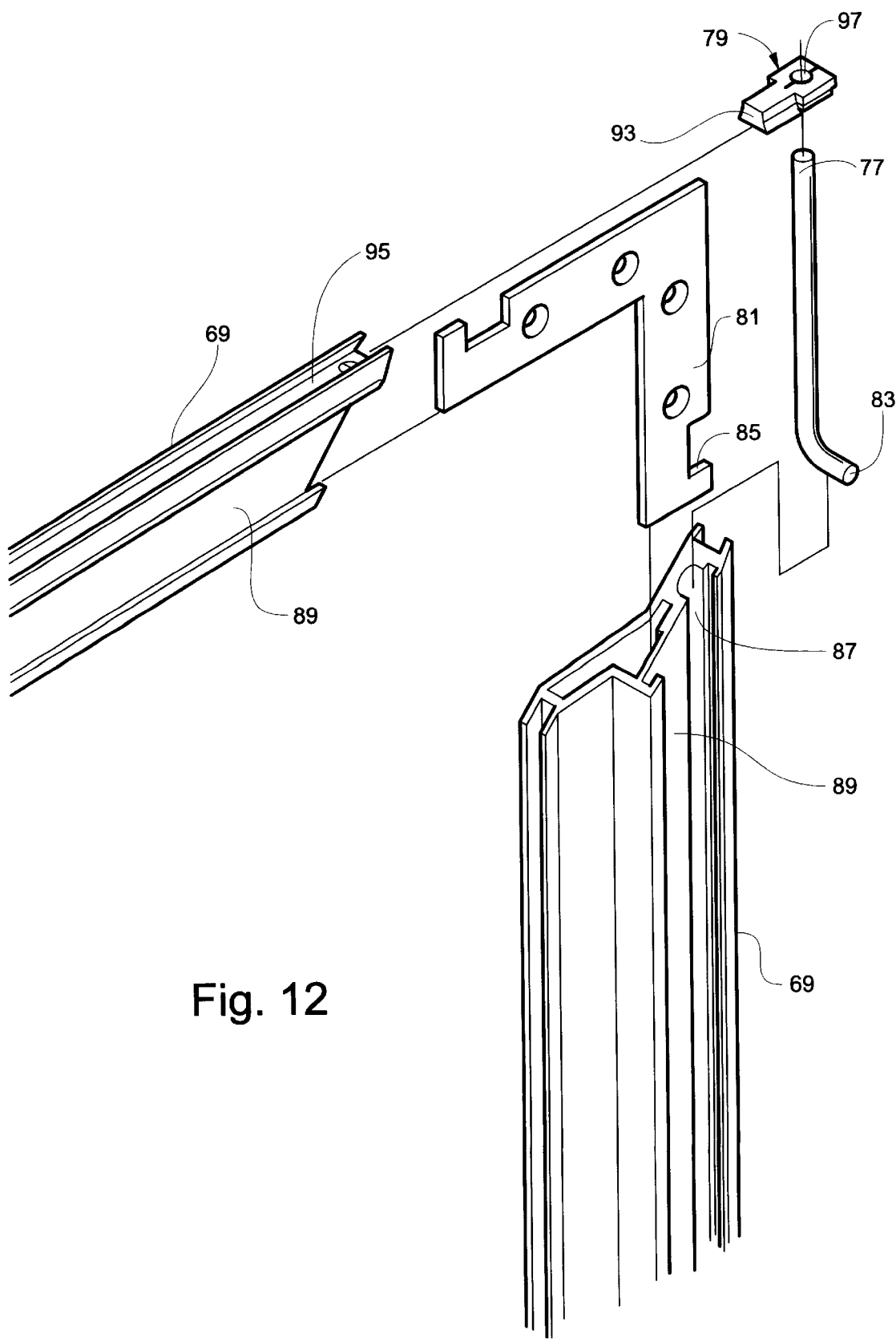
FIG. 12 is a partially exploded isometric view of the retractable pivot pin assembly of FIG. 11.

The pivot pin 77, as best seen in FIG. 12, has a bent portion which forms a slide key 83 when incorporated in the pivot pin assembly 75. The pivot pin 77 is received in a semicircular channel 87 of the frame member 69, and extends through the bushing 79 in a friction fit which permits sliding movement of the pin 77 through the bushing 79. The slide key 83 of the pivot pin 77 extends through a notch 85 formed in the angle bracket 81 so that the range of sliding movement of the pivot pin 77 is limited by the walls of the notch 85.

Figure 13:
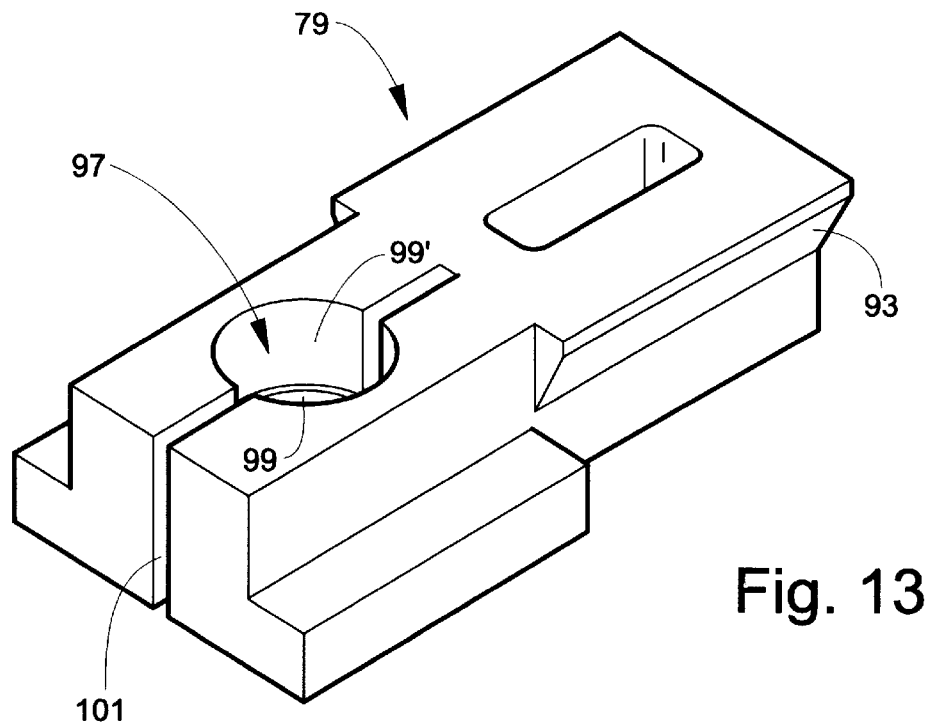
FIG. 13 is an isometric view of the bushing of the pivot pin assembly of FIG. 11.

The angle bracket 81 is received in a channel 89 of the door frame members 69 and is secured thereto by threaded fasteners 91. This arrangement provides for a strong and rigid joint at the corners where the door frame members 69 meet. The split bushing 79 includes a dovetail portion 93 which is received in a dovetail channel of the door frame member 69. Through the mating of the dovetail 93 and the dovetail channel 95, along with engagement of the pivot pin 77 through a split bushing opening 97, as seen in FIG. 13, the split bushing 79 is positively held in place on the frame member 69.

Figure 14:
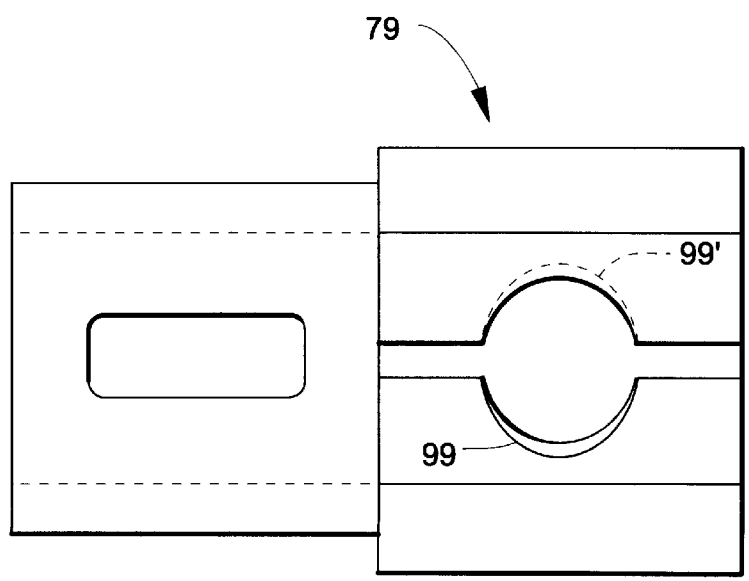
FIG. 14 is a top elevation of the bushing of FIG. 13.

As seen in FIG. 14, the split bushing hole 97 includes two hole portions 99,99' which have slightly offset axes, so that the two hole portions 99,99' are not completely aligned. This arrangement provides for positive frictional engagement of the pivot pin 77 by the bushing 79, so as to hold the pivot pin 77 in place once it is positioned as desired. The split bushing 79 also includes a slot 101 to allow for expansion of the split bushing hole 97 to fit the pivot pin 77 as needed.

Figure 15:
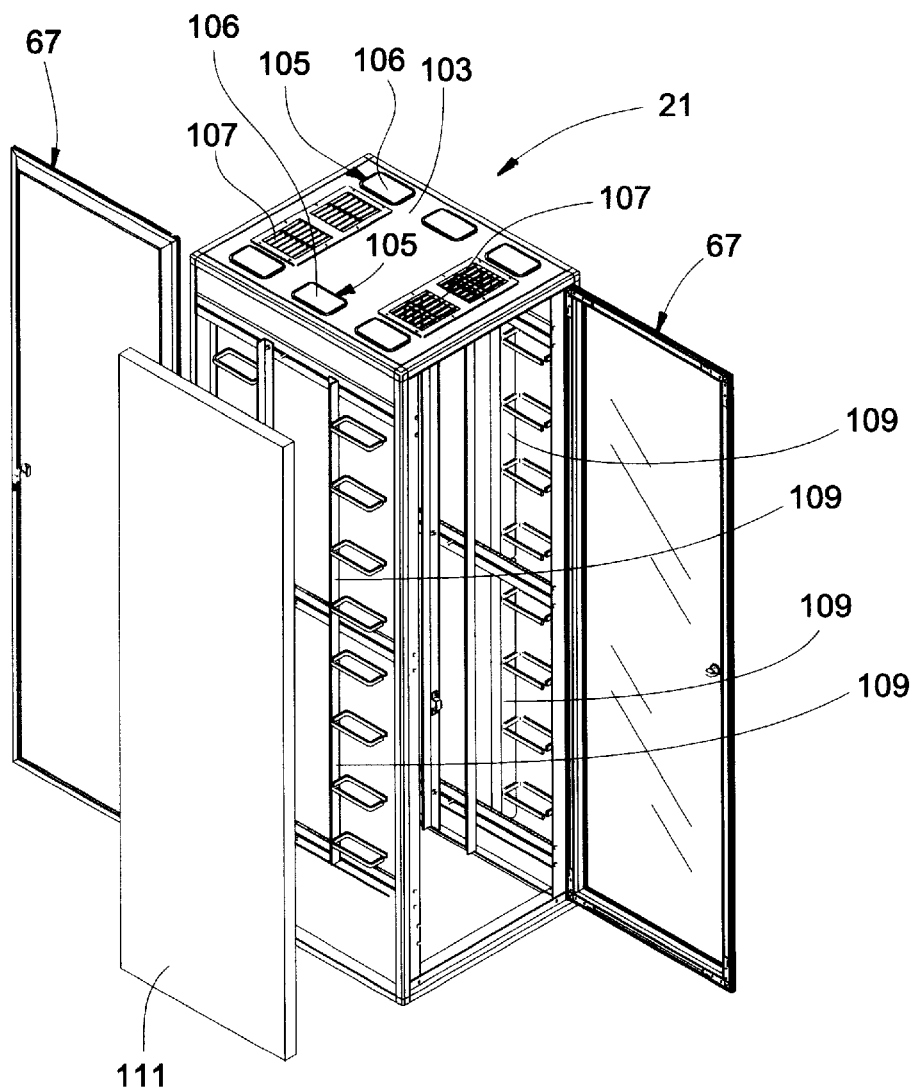
FIG. 15 is an isometric view of a rack frame cabinet of the present invention including a top panel, vertical cabling brackets, cabinet sides, and cabinet doors.

In FIG. 15, the rack frame cabinet 21 of the present invention is shown outfitted with a number of additional useful features. A top panel 103 is positioned at the top of the rack frame cabinet 21 to provide protection from dust and greater security. Cable access ports 105 are formed in the top panel 103 and have covers 106 which can be removed to provide appropriate openings for routing of wiring and cable therethrough. Vents 107 are also formed at the top panel 103 and allow warm air to escape from the rack frame cabinet 21. In addition, ventilation fans (not shown) can also be mounted in the vents 107 to provide forced exhaust of air out of the rack frame cabinet 21 where desired.

Vertical cable ring brackets 109 are mounted on the sides of the rack frame cabinet 21 and the guide rails 33 by engagement of threaded fasteners through the vertical cable ring brackets 109 and into the square nuts 65 slidingly received in the outward T-slots 63 of the guide rails 33. By this arrangement, the lateral position of the vertical cable ring brackets 109 can easily be adjusted to create the desired configuration for efficient routing of wiring cable through the rack frame cabinet 21.

Side panels 111 can also be mounted on the sides of the rack frame cabinet 21 to provide further protection and security for the electronic components housed therein. The side panels can be formed from aluminum sheet, plexiglass, or other appropriate materials. The mounting of the vertical cable ring brackets 109 on the inwardly extending large flanges 45 of the posts 23 provide sufficient clearance so that the vertical cable ring brackets 109 can be mounted inward of the side panels 111.

The doors 67 can be mounted on the front or rear of the rack frame cabinet 21 in the manner as described above and can be positioned to open to the left or right. The door 67 may have a plexiglass panel 71, a panel made of other transparent material, or a panel made of aluminum, plastic, or other opaque material, as desired.

The rack frame cabinet 21 of the present invention can be quickly and easily assembled and the appropriate features desired can readily be installed thereon. The rack frame cabinet 21 can be shipped to consumers with the posts 23 and side cross members 25 already joined together and the purchaser can quickly install the front cross members 27 and rear cross members 29 to form the rack frame cabinet 21. Shipping of such preassembled subframes 38 made up of the posts 23 and side cross members 25 can be inexpensively done since these elements can readily be stacked on top of one another to form a small package, and the aluminum construction of the rack frame cabinet 21 in its preferred embodiment gives it a lightweight but strong structure.

Attachment of the front cross members 27 and the rear cross members 29 is easily accomplished through the use of threaded fasteners which join the small flanges 47 of the cross members 27,29 to the large flanges 45 of the corresponding components and the large flanges 45 of the cross members 27,29 to the small flanges 47 of the corresponding components. The geometry of the flanges 45,47, together with the friction fit of the corner brackets in the cavities 51 of the structural members, allows the front and rear cross members 27,29 to be readily attached, since each joint has an inherent stability once assembled, even prior to engagement of the threaded fasteners to securely affix the structural elements to each other.

Each rack frame cabinet 21 can also quickly be configured with the optimal features desired by each user. The adjustable positioning of the rack rails 35, which is made possible by sliding threaded fasteners 59 received in the inward T-slot 61 of the guide rails 33, permits the rack rails 35 to be swiftly positioned for efficient usage. The vertical cable ring brackets 109 are also easily installed in this square nut 65 which are received in the outward T-slots 63 of the guide rails 33, and the vertical cable ring brackets 109 can also be selectively positioned as desired along the horizontal extent of the guide rails 33. Installation of the top panel 103 is simply accomplished through the use of threaded fasteners and side panels 111 can also be quickly added to the rack frame cabinet 21 as needed by such threaded fasteners.

The doors 67, which are preferably configured with the retractable pivot pin assembly 75 at appropriate corners, can be added to the rack frame 21 with little effort. The door 67 is simply positioned on the front of the rack frame cabinet 21 and the respective pivot pins 77 on the side of the door 67 which is selected for pivotal mounting are merely extended into appropriate bores made in the front or rear cross members 27,29 to accomplish the pivotal mounting of the door 67. The split bushing 79, which provides for frictional holding of the pivot pin 77 in the extended or retracted position as selected, also serves as a bearing surface to reduce friction during opening and closing of the door 67. The notches 57 of the corner brackets 31 provide clearance so that the pivot pins 77 do not bind on the horizontal lugs 41. The split bushing is preferably made from acetal copolymer, although the scope of the present invention includes the use of material such as plastic, rubber, soft metals, or other substances for the bushing 79.

The simple yet highly effective arrangement of the retractable pivot pin assembly 75 advantageously provides for pivotal mounting of the door 67 with a minimal number of parts. The slide key 83 of the pivot pin 77 can easily be manipulated to extend or retract the pin 77, and the split bushing 79 maintains the pivot pin in the desired orientation through the frictional grip brought about by offset hole portions 99,99'. Through this arrangement, no spring or other biasing arrangement is required to maintain the pin 77 in its extended position, making the retractable pivot pin assembly 75 easy to install and maintain.

The rack frame cabinet 21 of the present invention therefore has several advantages over previous rack frames. The flanged extrusions which form the post 23 and the cross members 25,27,29 are easily assembled through the use of the corner brackets 31, and can readily be secured to each other by installation of threaded fasteners through the appropriate holes 43 formed in the large flanges 45 and small flanges 47 on the structural members. The joints formed by these members are, owing to the geometry of the large flanges 45 and small flanges 47, together with the friction fitted corner brackets 31, inherently stable, self aligning, and structurally rigid.

The light weight of the posts 23 and cross members 25,27,29 also allow them to be shipped in a knock-down form and easily assembled on-site which significantly reduces transportation and shipping expenses. The self-aligning nature of the rack frame cabinet 21 further makes assembly quick and eliminates time ordinarily taken in squaring joints and aligning structural components.

It will therefore be readily understood by those persons skilled in the art that the present invention is susceptible of broad utility and application. Many embodiments and adaptations of the present invention other than those herein described, as well as many variations, modifications and equivalent arrangements, will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements, the present invention being limited only by the claims appended hereto and the equivalents thereof.

I claim:

1. A rack frame cabinet for supporting electronic components having a plurality of elongate frame members and a plurality of corner brackets arranged to engage at least three adjacent frame members at each corner of said cabinet, the improvement wherein:

(a) each of said elongate frame members includes a tube portion defined by walls forming a cavity therein, a first flange member, and a second flange member; said tube portion and said first and second flange members extending along the length of said elongate frame member; said first flange member aligned with a first one of said walls of said tube portion; said second flange member being parallel to and offset from a second one of said walls of said tube portion; said first and second flange members being arranged substantially perpendicular to one another; and (b) said frame members being arranged at each corner of said cabinet so that a portion of said first flange member of one frame member overlaps and connects to a portion of said second flange member of one of said adjacent frame members and a portion of said second flange member of one frame member overlaps and connects to a portion of said first flange member of another of said adjacent frame members.

2. The improved rack frame cabinet of claim 1 wherein each of said corner brackets includes at least three lugs oriented at right angles to each other; each of said lugs shaped to engage in friction fit with said cavity formed in a respective one of said three adjacent frame members.

3. The improved rack frame cabinet of claim 2 wherein at least two of said at least three lugs are positioned in the same plane and at least one of said at least three lugs extends perpendicularly to the plane of said at least two lugs.

4. The improved rack frame cabinet of claim 1 wherein for each of said frame members said second flange member is offset from said second of said walls of said tube portion by a distance approximately equal to the thickness of said first flange member.

5. The improved rack frame cabinet of claim 4 wherein a portion of said first flange member of said one frame member overlaps a portion of said second flange member of said one of said adjacent frame members so that said first flange member aligns with said first of said walls of said tube portion of said one of said adjacent frame members.

6. The improved rack frame cabinet of claim 4 wherein a portion of said second flange member of said one frame member overlaps a portion of said first flange member of said another of said adjacent frame members so that said first flange member of said another of said adjacent frame members align with said first of said walls of said tube portion of said one frame member.

7. The improved rack frame cabinet of claim 1 wherein for each of said frame members said first and said second flange members have holes; said holes being aligned for receiving threaded fasteners therethrough to connect said portions of said adjacent frame members.

8. The improved rack frame cabinet of claim 1 wherein each of said elongate frame members has the same general cross-sectional profile.

9. A rack frame cabinet for supporting electronic components comprising:

a plurality of elongate frame members, each of said elongate frame members comprising:
 a tube portion defined by walls forming a cavity therein, a first flange member, and a second flange member; said tube portion and said first and second flange members extending along the length of each of said elongate frame members;

a plurality of corner brackets, each of said corner brackets arranged to engage at least three adjacent frame members at a corner of the cabinet; and wherein a portion of said first flange member of one frame member overlaps and connects to a portion of said second flange member of one of said adjacent frame members and a portion of said second flange member of said one frame member overlaps and connects to a portion of said first flange member of another of said adjacent frame members.

10. The improved rack frame cabinet of claim 9 wherein each of said corner brackets includes at least three lugs oriented at right angles to each other; each of said lugs shaped to engage in friction fit with said cavity formed in a respective one of said three adjacent frame members.

11. The improved rack frame cabinet of claim 10 wherein at least two of said at least three lugs are positioned in the same plane and at least one of said at least three lugs extends perpendicularly to the plane of said at least two lugs.

12. The rack frame cabinet of claim 9 wherein for each of said frame members said first flange member is in alignment with a first one of said walls of said tube portion, said second flange member is parallel to and offset from a second one of said walls of said tube portion, and said first and second flange members are substantially perpendicular to one another.

13. The improved rack frame cabinet of claim 12 wherein for each of said frame members said second flange member is offset from said second of said walls of said tube portion by a distance approximately equal to the thickness of said first flange member.

14. The improved rack frame cabinet of claim 13 wherein a portion of said first flange member of said one frame member overlaps a portion of said second flange member of said one of said adjacent frame members so that said first flange member aligns with said first of said walls of said tube portion of said one of said adjacent frame members.

15. The improved rack frame cabinet of claim 13 wherein a portion of said second flange member of said one frame member overlaps a portion of said first flange member of said another of said adjacent frame members so that said first flange member of said another of said adjacent frame members align with said first of said walls of said tube portion of said one frame member.

16. The improved rack frame cabinet of claim 9 wherein for each of said frame members said first and said second flange members have holes; said holes being aligned for receiving threaded fasteners therethrough to connect said portions of said adjacent frame members.

17. The improved rack frame cabinet of claim 9 wherein each of said elongate frame members has the same general cross-sectional profile.

* * * * *